(12) United States Patent
Kirkpatrick (10) Patent No.: US 10,061,074 B1
(45) Date of Patent: Aug. 28, 2018

(54) METHOD AND APPARATUS FOR TRANSFORMING LIGHT FROM A SET OF POINT LIGHT SOURCES INTO A UNIFORM FIELD OF ILLUMINATION

(71) Applicant: Pure Storage, Inc., Mountain View, CA (US)

(72) Inventor: Peter Kirkpatrick, Mountain View, CA (US)

(73) Assignee: Pure Storage, Inc., Mountain View, CA (US)

( * ) Notice: Subject to any disclaimer, the term of this patent is extended or adjusted under 35 U.S.C. 154(b) by 189 days.

(21) Appl. No.: 14/708,111

(22) Filed: May 8, 2015

(51) Int. Cl.
  *F21V 7/04* (2006.01)
  *F21V 8/00* (2006.01)

(52) U.S. Cl.
  CPC ......... *G02B 6/0061* (2013.01); *G02B 6/0036* (2013.01); *G02B 6/0045* (2013.01); *G02B 6/0046* (2013.01); *G02B 6/0051* (2013.01); *G02B 6/0055* (2013.01)

(58) Field of Classification Search
  CPC .. G02B 6/0061; G02B 6/0036; G02B 6/0051; G02B 6/0055; G02B 6/0058
  See application file for complete search history.

(56) References Cited

U.S. PATENT DOCUMENTS

| | | | | |
|---|---|---|---|---|
| 4,729,068 A * | 3/1988 | Ohe | .......................... | F21V 7/00 359/599 |
| 2004/0218376 A1* | 11/2004 | Ng | ........................ | G02B 6/0061 362/611 |
| 2007/0223250 A1* | 9/2007 | Chen | ..................... | G02B 6/0061 362/614 |
| 2009/0016068 A1* | 1/2009 | Chang | .................. | G02B 6/0021 362/309 |
| 2009/0027893 A1* | 1/2009 | Chang | ............... | G02F 1/133603 362/309 |
| 2009/0190069 A1* | 7/2009 | Dejima | ................ | G02B 6/0036 349/65 |
| 2014/0321155 A1* | 10/2014 | Rho | ...................... | F21V 7/0091 362/606 |

* cited by examiner

*Primary Examiner* — Alexander Garlen
(74) *Attorney, Agent, or Firm* — Womble Bond Dickinson (US) LLP (57) ABSTRACT

A light directing apparatus is disclosed. The light directing apparatus includes light directing structures that are configured to receive light from a light emitting apparatus, a first plurality of spaces that separate the light directing structures in a first direction and a second plurality of spaces that separate the light directing structures in a second direction. A dimension of the first plurality of spaces and a dimension of the second plurality of spaces increases with distance from the light emitting apparatus.

20 Claims, 10 Drawing Sheets

PATTERNED AREA IN SHAPE AT TRANSPARENT COMPONENT

METHOD AND APPARATUS FOR TRANSFORMING LIGHT FROM A SET OF POINT LIGHT SOURCES INTO A UNIFORM FIELD OF ILLUMINATION

BACKGROUND

Lighting technologies used in electrical and electronic devices are employed to achieve practical and/or esthetic effects. There are many types of lighting technologies. A conventional type of lighting technology that is used in electrical and electronic devices is called "backlighting."

Typically, backlighting involves the use of a backlight to illuminate objects from behind. Backlights are commonly used in LCD devices. In such devices, backlights can be used to illuminate a display panel of an LCD device from either the side or the back. In devices where the display panel is illuminated from the back, the backlight is usually the backmost layer.

In some cases, conventional lighting technologies (including backlighting technologies) may not provide illumination that is of sufficiently high quality. For example, the illumination that is provided may not be sufficiently bright and/or uniform and can render it difficult to view illuminated objects from certain angles (i.e., the illumination has poor directionality). Some of the challenges to providing high quality illumination can be due to engineering design constraints related to size, power and cost.

It is in this context in which the present embodiments arise.

SUMMARY

Providing high quality illumination using conventional lighting technologies can be problematic because of engineering design constraints related to size, power and cost. A light directing apparatus that uses a pattern of light directing structures to produce a uniform and angularly diverse field of light rays is disclosed that addresses the aforementioned shortcomings of conventional technologies. The apparatus includes light directing structures that are configured to receive light from a light emitting apparatus, a first plurality of spaces that separate the light directing structures in a first direction and a second plurality of spaces that separate the light directing structures in a second direction. A dimension of the first plurality of spaces and a dimension of the second plurality of spaces increases with distance from the light emitting apparatus. The pattern provided by the light directing structures enables an illumination gradient of the light directing structures to increase as the distance from the light emitting apparatus increases. The uniform field of illumination produced by the apparatus enables the provision of high quality illumination (e.g., light brightness, uniformity and directionality) that can be transmitted out to an observer.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims. For example numerous patterns and shapes may be employed with the embodiments to achieve the illumination effects described below.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. Similarly, various requirements are described which may be requirements for some embodiments but not other embodiments.

Figure 1A:
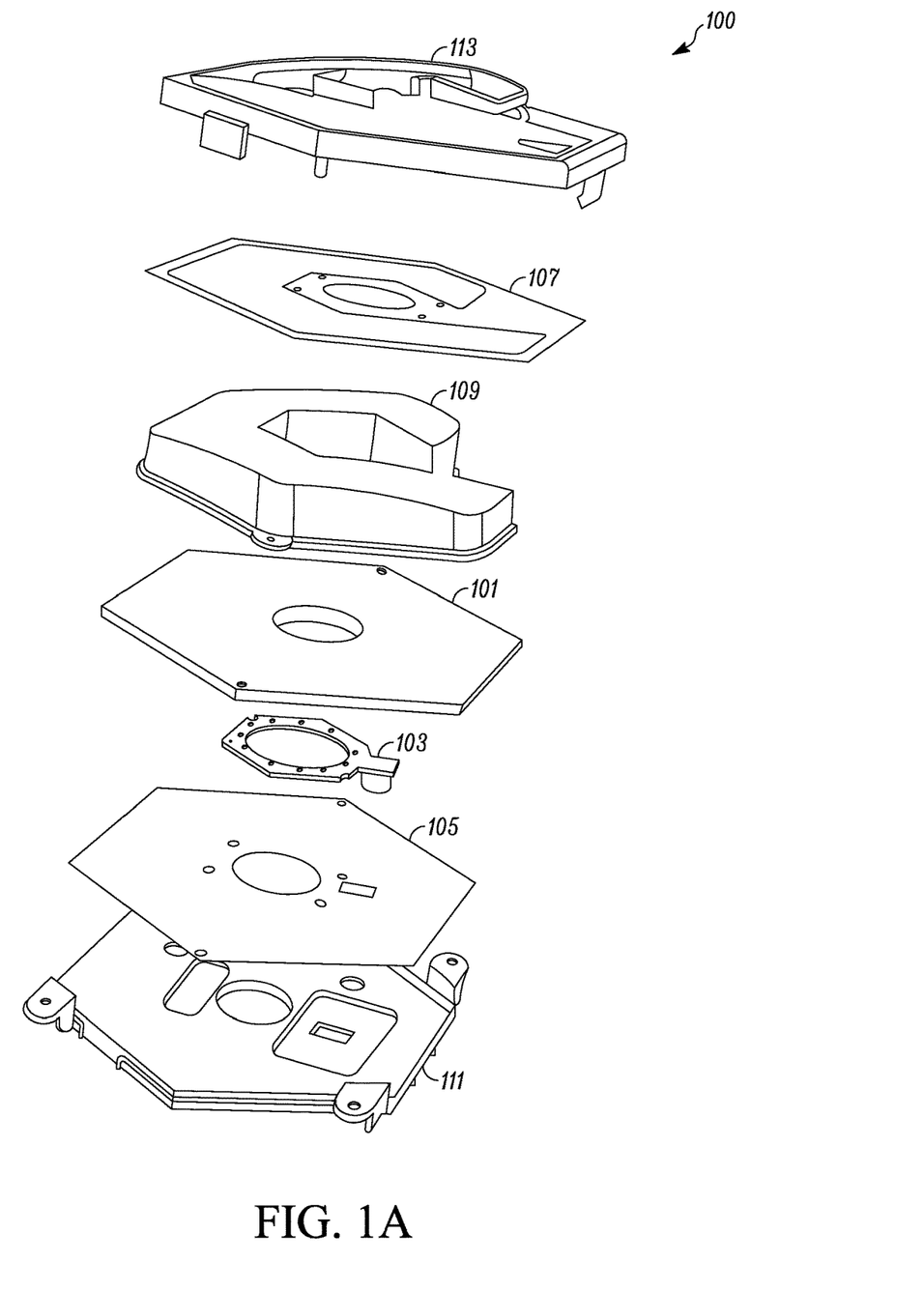
FIG. 1A shows an example of an operating environment of an apparatus for transforming light from a set of point light sources into a uniform field of illumination according to some embodiments.

FIG. 1A shows an exemplary operating environment 100 of an apparatus 101 for transforming light from a set of point light sources into a uniform field of illumination according to one embodiment. Apparatus 101 directs light received from a set of light sources to a pattern of light directing structures that produces a uniform and angularly diverse field of light rays that is directed toward a transparent component. In some embodiments the light sources are point light source. However, alternative light sources besides point light sources may be integrated into the embodiments. Apparatus 101 enables the illumination of the transparent component by a uniform field of illumination as further explained below. Moreover, apparatus 101 enables high quality illumination (e.g., light brightness, uniformity and directionality) to be provided under conditions where size, power and cost considerations present significant design constraints. In the FIG. 1A embodiment, operating environment 100 can include apparatus 101, light emitting apparatus 103, bottom reflector 105, top reflector 107, transparent component 109, bottom cover 111 and top cover 113.

Referring to FIG. 1A, light emitting apparatus 103 emits light that is received or generated by apparatus 101. In one embodiment, light emitting apparatus 103 emits light that has a conical emission profile. In other embodiments, light emitting apparatus 103 can emit light that has other types of emission profiles. In one embodiment, light emitting apparatus 103 emits light that is propagated in a plane that is parallel with a surface of the base illumination component of apparatus 101. Light emitting apparatus 103 can include a set of point light sources in a ring formation and the set of point light sources can include a circuit board with light emitting diodes (LEDs) mounted thereon. As mentioned above, light emitting apparatus 103 can include other types of light sources besides an LED light source. In addition, as explained below, the light source may be located around the exterior of apparatus 101, rather than an interior circular channel of apparatus 101, in some embodiments.

Figure 1B:
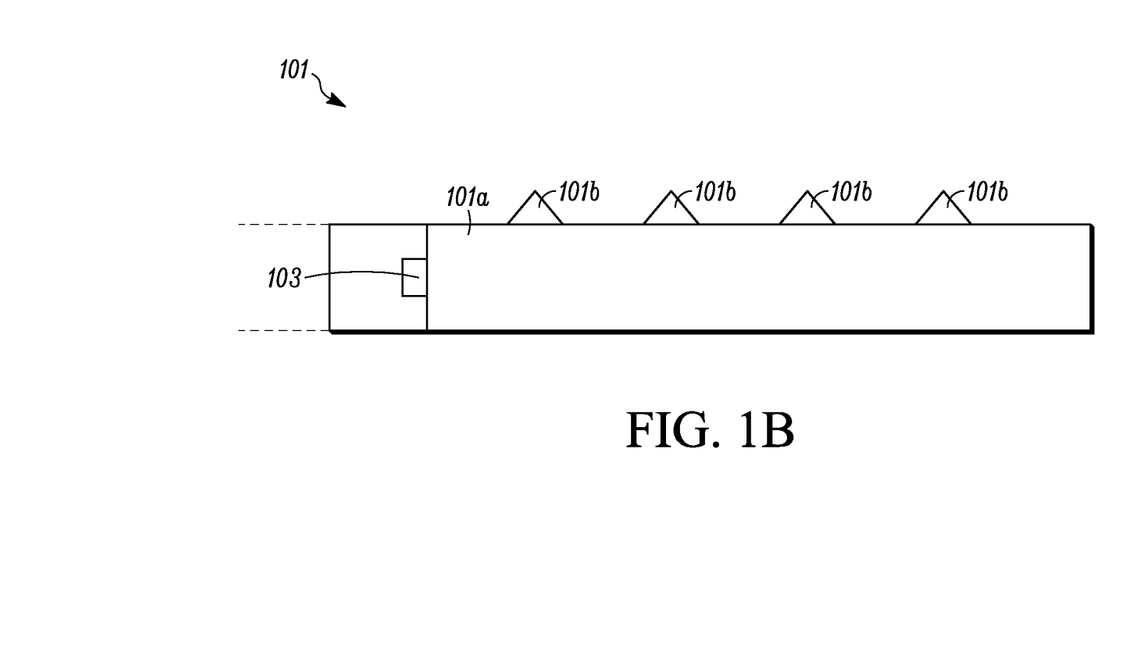
FIG. 1B shows illumination component base and light directing structures according to some embodiments.

Apparatus 101 receives light that is emitted from light emitting apparatus 103 in a first plane of propagation and rotates or changes the direction of propagation of the received light by about ninety degrees in some embodiments. A pattern of structures disposed on apparatus 101 redirects the light to produce light that is characterized by angular diversity and uniform illumination strength. In one embodiment, apparatus 101 includes illumination component base 101a and light directing structures 101b as shown in FIG. 1B (a detailed description of components of the structure of apparatus 101 is provided below with reference to FIGS. 2A and 2B). Referring to FIG. 1B, in one embodiment, illumination component base 101a is the component of apparatus 101 that receives the light that is emitted from light emitting apparatus 103. The light that propagates through illumination component base 101a is caused to strike light directing structures 101b (such as by reflections and refractions that direct light toward light directing structures 101b). Light directing structures 101b are configured to cause, by reflection and refraction, the direction of propagation of the light to be generally redirected or rotated by about ninety degrees in some embodiments. Apparatus 101 is a transparent material bit this is not limiting as apparatus 101 may be translucent in some embodiments.

Figure 1C:
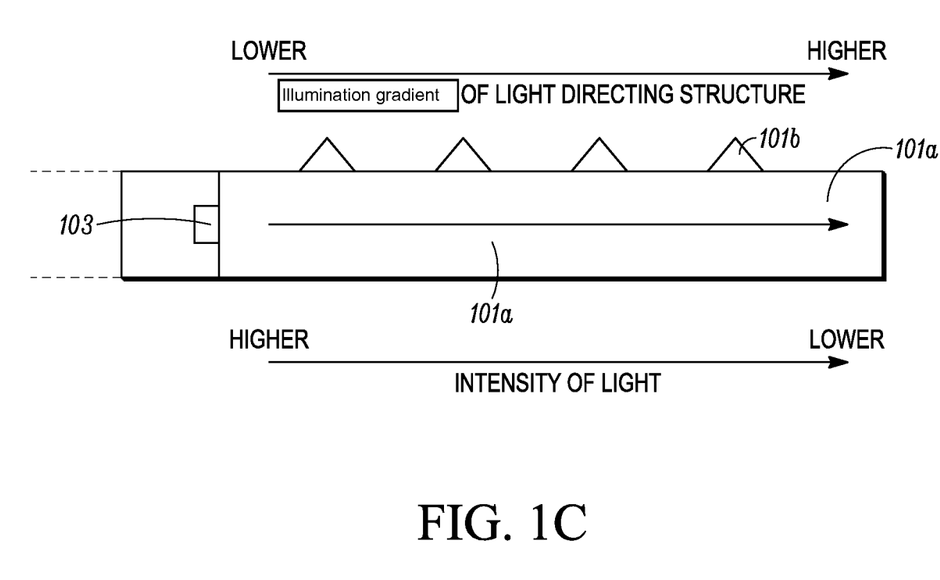
FIG. 1C illustrates an illumination gradient of the light directing structures that increases as the distance of the light directing from the light emitting apparatus according to some embodiments.

In addition light directing structures 101b are configured to cause the light to have uniform illumination strength. For example, in one embodiment, the pattern of light directing structures 101b is configured to have a reflective and refractive profile that is referred to as an illumination gradient. In particular, the pattern of light directing structures 101b is configured such that individual structures of light directing structures 101b have a reflectivity and refractivity profile, i.e., an illumination gradient, which increases with their distance from light emitting apparatus 103 as illustrated in FIG. 1C. That is, light directing structures 101b of apparatus 101 have a reflectivity and refractivity component that increases as the distance from the light emitting apparatus 103 increases. Thus, as the intensity of the light received from light emitting apparatus 101 decreases farther from the light emitting apparatus, the increase in the illumination gradient functions to increase the intensity of the light in order to provide an even illumination effect along the path of travel of the light rays. In this manner, apparatus 101 is structured to compensate for decreasing light intensity such that a uniform field of illumination is caused to be propagated from apparatus 101.

Referring again to FIG. 1A, transparent component 109 is positioned above apparatus 101 and is illuminated by the uniform field of illumination that is propagated from apparatus 101. Moreover, transparent component 109 couples the illumination that is propagated from apparatus 101 to the external environment such that it is visible to observers. In one embodiment, transparent component 109 can include surface texturing on one or more of its surfaces that can operate to further scatter light (in addition to the scattering that is effected by apparatus 101). The additional scattering serves to increase the uniformity of the field of illumination that is coupled out to observers. In one embodiment, transparent component 109 can include a logo (as is shown in the FIG. 1A embodiment). In other embodiments, transparent component 109 can include other types of implementations and other shapes not related to logos. The side surfaces of transparent component 109 may be clear or textured. Transparent component 109 may have varying degrees of transparency and in some embodiments that transparency may be more translucent.

Bottom reflector 105 prevents light from exiting the bottom of the illumination component base of apparatus 101 by reflecting light back into the illumination component base of apparatus 101. In one embodiment, the light rays that are reflected back into illumination component base continue to contribute to the angular diversity of the light that is directed toward light directing components 101b and toward observers. Top reflector 107 prevents light from exiting transparent component 109 by reflecting light back into apparatus 101 where the reflected light can continue to contribute to the angular diversity of the light that is directed toward light directing components 101b. In one embodiment, top reflector 107 includes a space through which transparent component 109 can extend. In the FIG. 1A embodiment, top cover 113 and bottom cover 111 are configured to enclose components that are stacked and aligned between in a predetermined configuration. In one embodiment, top cover 113 includes a space through which transparent component 109 can extend.

Figure 1D:
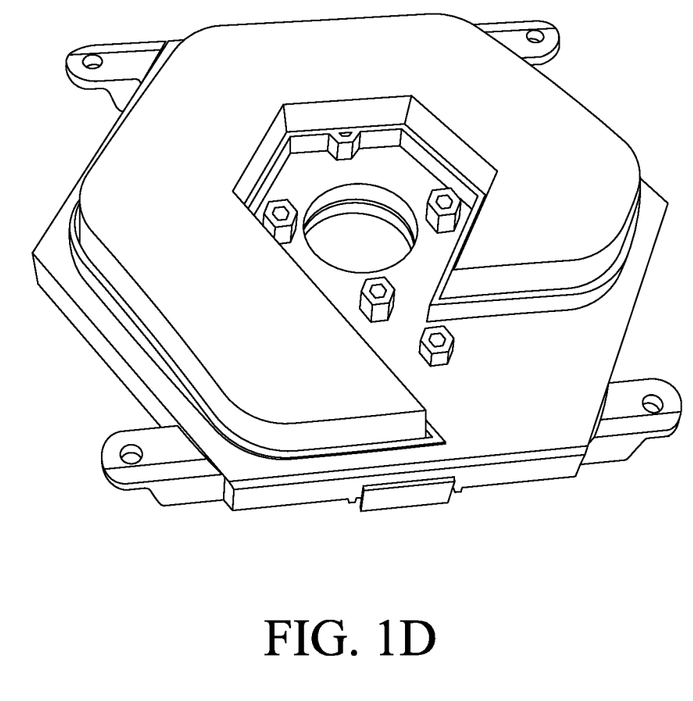
FIG. 1D shows a fully assembled logo implementation according to some embodiments.

FIG. 1D shows an exemplary logo assembly that is illuminated by apparatus 101 and that includes the other components described with reference to FIG. 1A. In the FIG. 1D embodiment, the fully assembled logo includes, among other parts, an illuminator (see apparatus 101 in FIG. 1A) that is hexagonal and flat, LED light sources (see light emitting apparatus 103 in FIG. 1A), that are mounted on a hexagonal PC board below the illuminator (see FIG. 1A), and, a logo (see transparent component 109 in FIG. 1A) that is stacked and aligned above the illuminator. In the FIG. 1D embodiment, the top surface of the illuminator and the bottom surface of the logo can be textured to enhance illumination angular diversity and field uniformity.

Figure 1E:
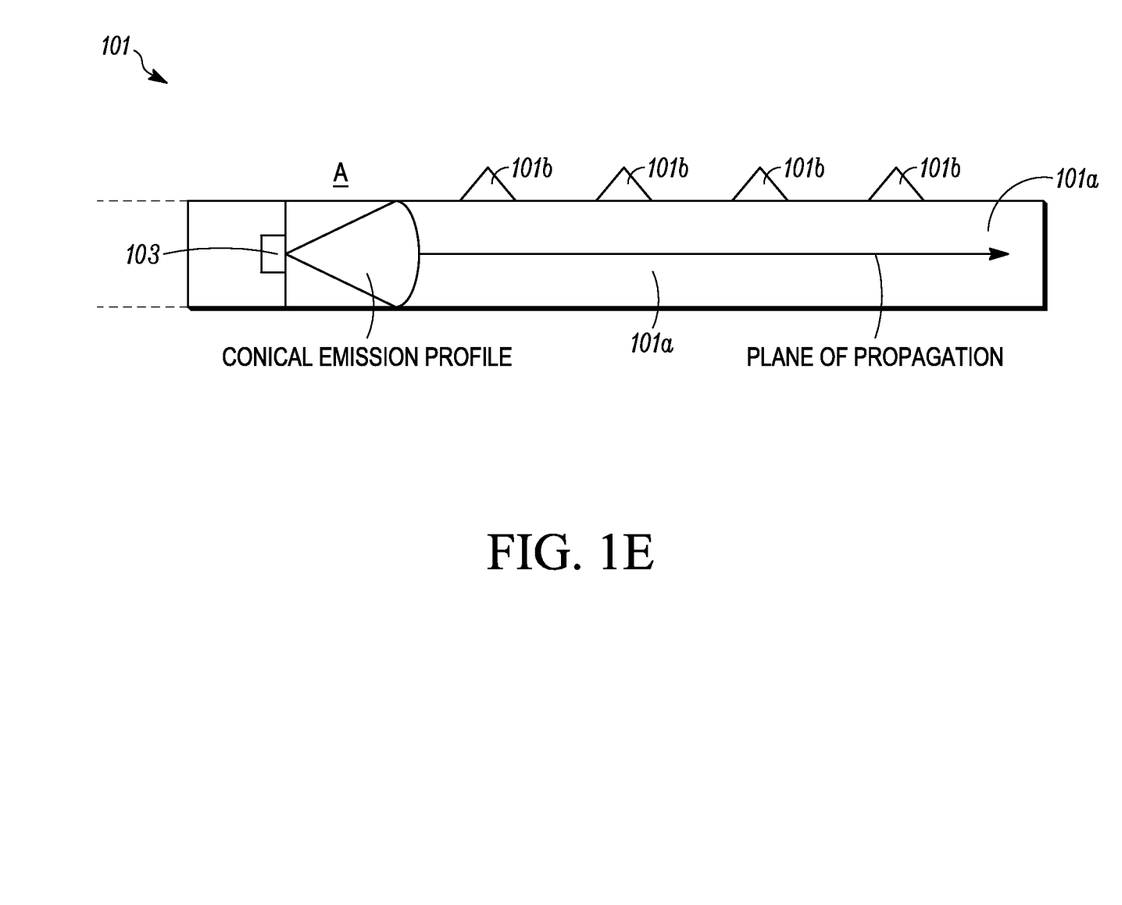
FIG. 1E illustrates an operation of the apparatus for transforming light from a set of point light sources into a uniform field of illumination according to some embodiments.
Figure 1F:
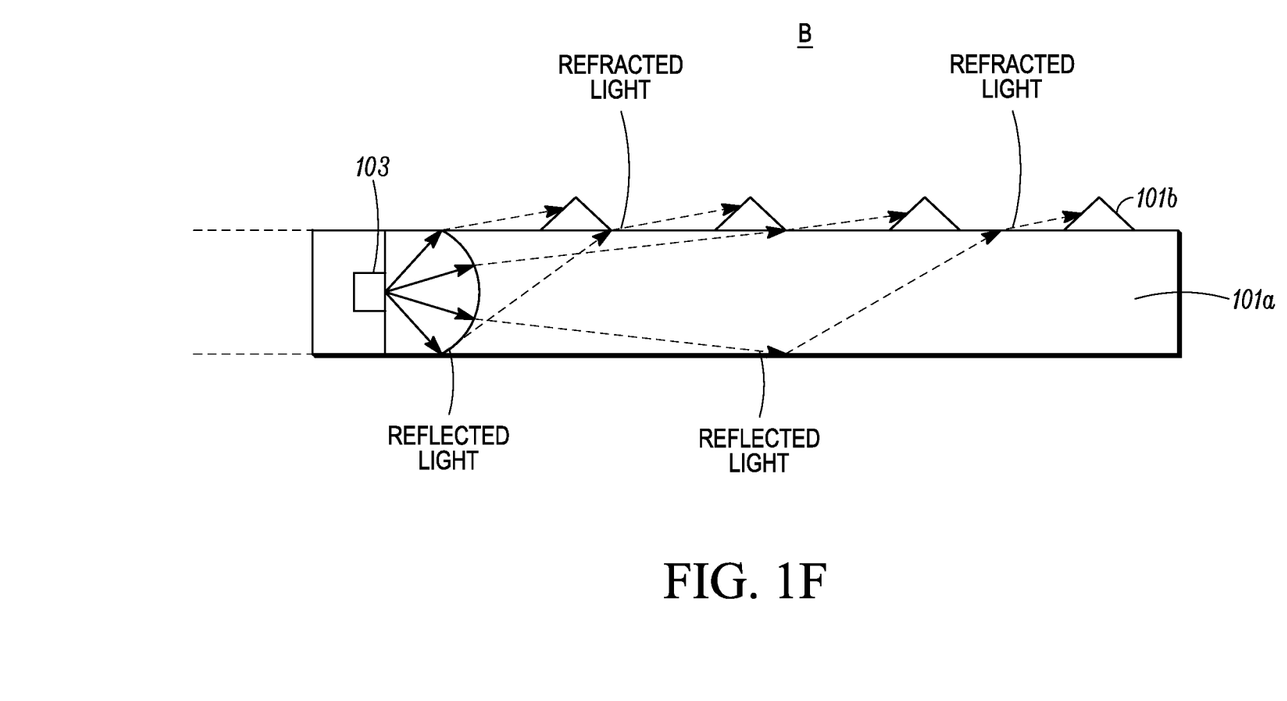
FIG. 1F illustrates an operation of the apparatus for transforming light from a set of point light sources into a uniform field of illumination according to some embodiments.
Figure 1G:
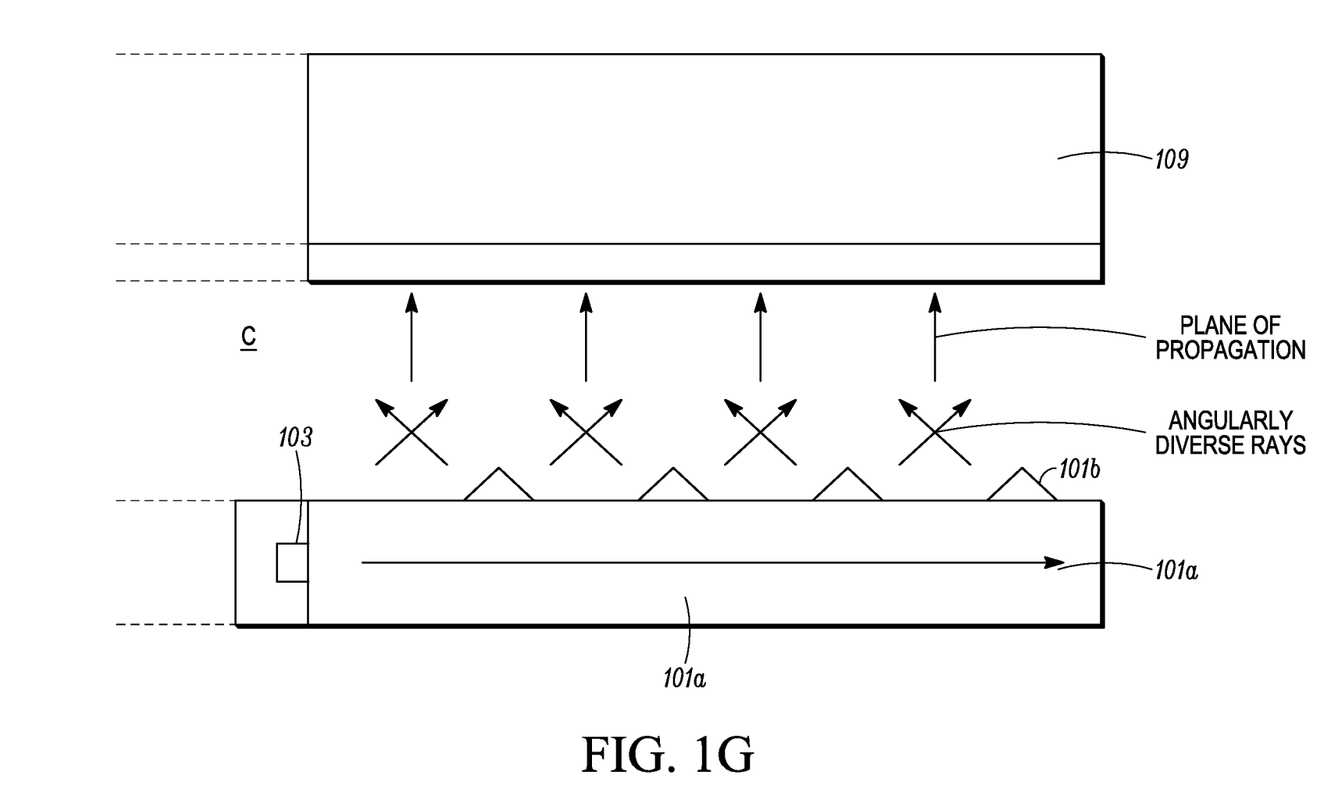
FIG. 1G illustrates an operation of the apparatus for transforming light from a set of point light sources into a uniform field of illumination according to some embodiments.

FIG. 1E-1G illustrate the operation of apparatus 101 for transforming light from a set of point light sources into a uniform field of illumination according to one embodiment. These operations, which relate transforming light from a set of light sources, are only exemplary. It should be appreciated that other operations not illustrated in FIGS. 1E-1G can be performed in accordance with one embodiment. Referring to FIG. 1E, at A, light is emitted from light emitting apparatus 103 into illumination component base 101a of apparatus 101 along a first plane of propagation. As shown in FIG. 1E, in one embodiment, the light that is emitted can have a conical emission profile, however, this is one embodiment and other light emission profiles may be integrated with the embodiments.

Referring to FIG. 1F, at B, the light received from light emitting apparatus 103 is directed toward a pattern of light directing structures 101b. As shown in FIG. 1F, light rays received from light emitting apparatus 103 can be directed toward light directing structures 101b by means of reflective and refractive processes. In one embodiment, in their path from light emitting apparatus 103 to light directing components 101b light rays can be refracted as they move from illumination component base 101a into the space between light directing components 101b. In addition, the light rays that are received from light emitting apparatus 103 that are initially directed toward areas of illumination component base 101a where the light rays are not desired to exit can be reflected by reflectors (see FIG. 1A) positioned at the top and bottom of illumination component base 101a back into illumination component base 101a and eventually toward light directing components 101b of apparatus 101. The reflecting and refracting gradients provide an illumination gradient that increases as the distance from the light source increases.

Referring to FIG. 1G, at C, angularly diverse light rays, of uniform illumination intensity are produced from the pattern of light directing structures 101b and are propagated in a direction that is orthogonal to the direction of propagation of the light received from the light emitting apparatus 103. As shown in FIG. 1G, angularly diverse light rays are propagated through transparent component 109 to provide a uniform illumination over the surface of the transparent component. In one embodiment, as described above, transparent component 109 couples the illumination propagated from apparatus 101 to the external environment where it is visible to observers. In FIGS. 1E-1G, light directing structure 101b are spaced farther apart from each other as the distance from light emitting apparatus 103 increases. In addition, the surface area of light directing structures 101b increases as the distance from light emitting apparatus 103 increases. Thus, an illumination gradient for the light directing structures characterizing a reflection and refraction gradient increases as the distance from light emitting apparatus 103 increases.

Figure 2A:
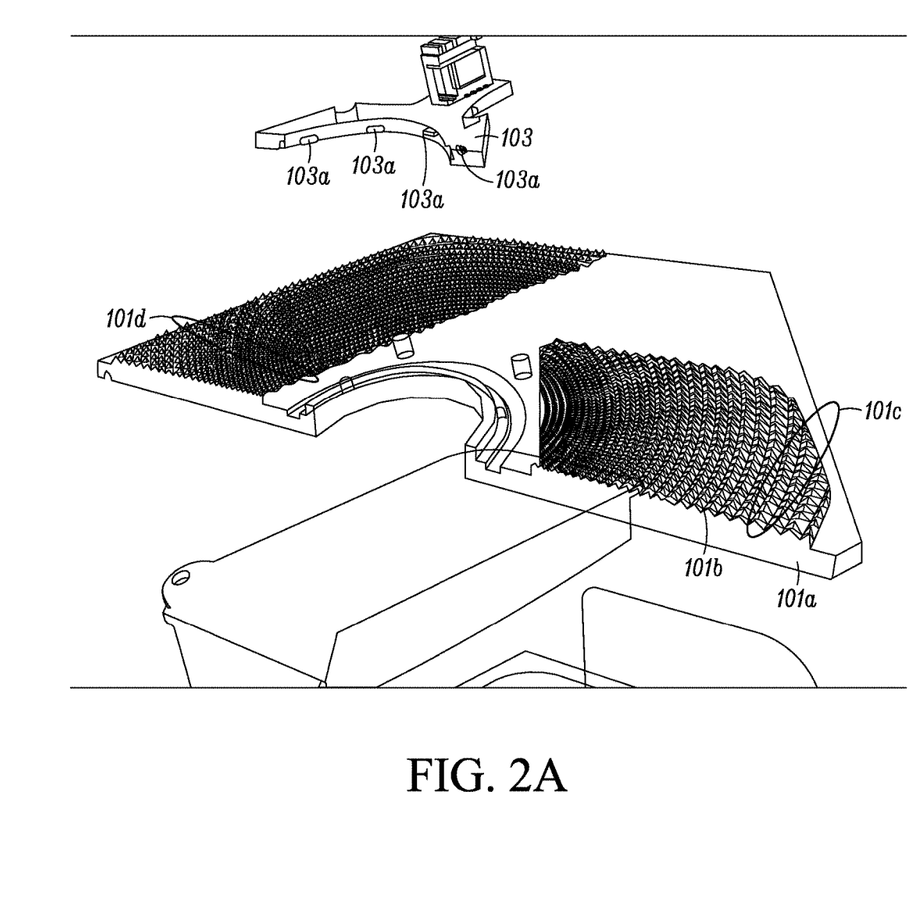
FIG. 2A shows a cross section view of an apparatus for transforming light from a set of point light sources into a uniform field of illumination according to some embodiments.
Figure 2B:
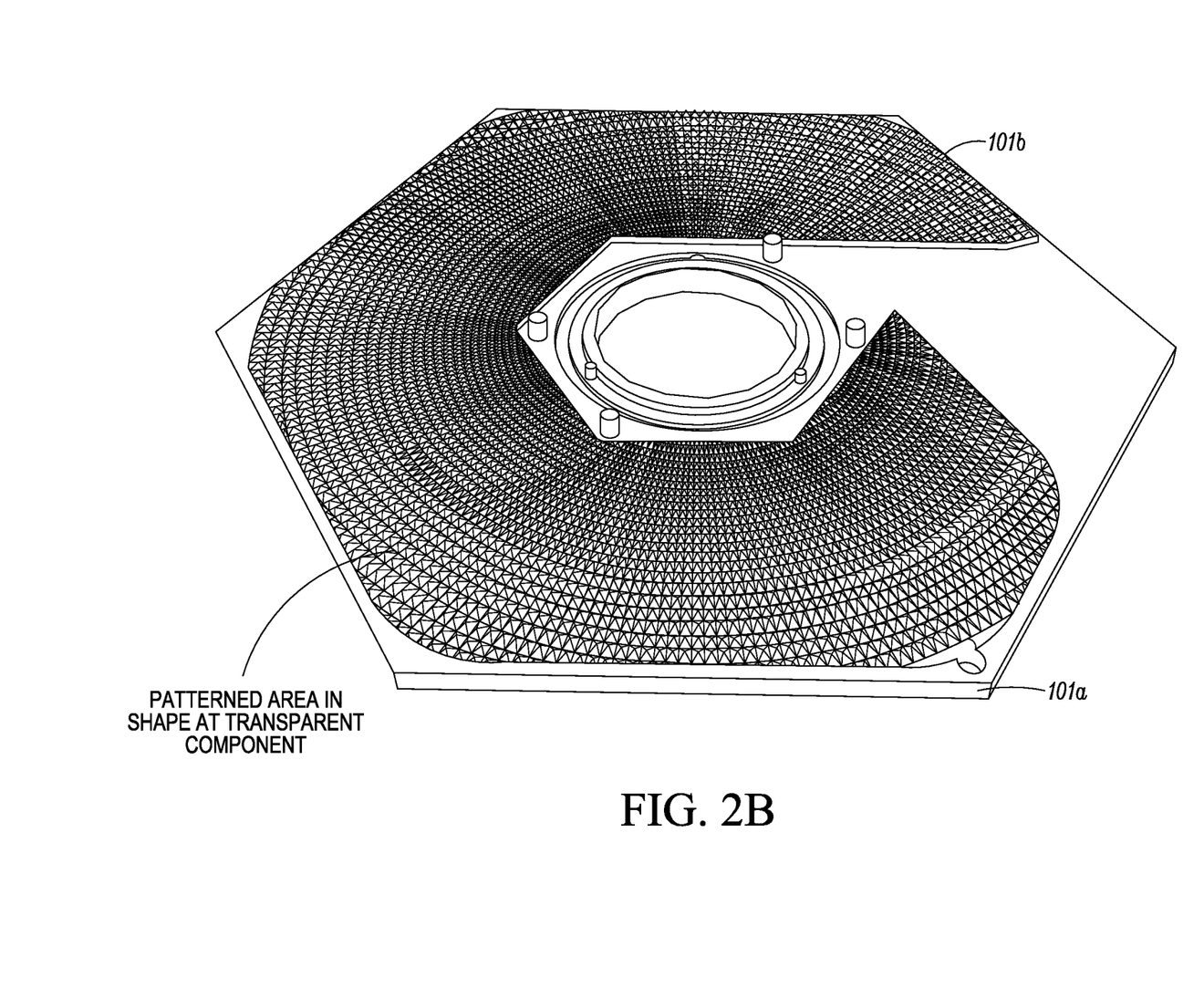
FIG. 2B shows a detailed surface view of an apparatus for transforming light from a set of point light sources into a uniform field of illumination according to some embodiments.

FIGS. 2A and 2B show an exemplary structural implementation of an apparatus 101 for transforming light from a set of point light sources into a uniform field of illumination according to one embodiment. FIG. 2A shows a cross section view of apparatus 101 and FIG. 2B shows a detailed surface view of apparatus 101 according to one embodiment. In one embodiment, components of apparatus 101 transform light from a light source (e.g., of light emitting apparatus 103 in FIGS. 1A and 2A) into a uniform field of illumination. FIG. 2A shows illumination component base 101a, light directing structures 101b, concentric grooves 101c and radial grooves 101d.

Referring to FIG. 2A, in one embodiment, illumination component base 101a can include a planar structure that receives light that is emitted from light emitting apparatus 103. In other embodiments, illumination component base 101a can include other shapes. In one embodiment, illumination component base 101a can be formed from plastic material. Alternatively, illumination component base 101a can be formed from material other than plastic that is transparent or translucent. In one embodiment, illumination component base 101a and/or light directing structures 101b can include surfaces that can be textured in order to enhance the scattering of light and the effecting of a uniform light field for output.

Light directing structures 101b redirect the light that is received from light emitting apparatus 101b from a first plane of propagation to a second plane of propagation toward a transparent component (see 109 in FIG. 1A) which is thereby illuminated. Light directing structures 101b are patterned to provide a uniform field of illumination to the transparent component as is described hereinabove in detail. Each light directing structure 101b belongs to both a radial and a concentric grouping of structures in the embodiments illustrated in FIG. 2A. It should be appreciated that alternative patterns to the radial and concentric grooves may be integrated with the embodiments as long as the patterns provide for the increased illumination gradient as the distance for the light source increases. Each light directing structure 101b within a concentric grouping of structures is separated by a groove that extends radially outward from the light emitting apparatus. Each light directing structure 101b within a radial grouping of structures is separated by a groove that has a circular or semicircular geometric pattern.

In one embodiment, light directing structures 101b are formed to rise above the surface of illumination component base 101a. In other embodiments, light directing structures 101b can be formed within illumination component base 101a. In one embodiment, light directing structures 101b can be formed on the backside of illumination component base 101a. In some embodiments, light directing structures 101b are formed to have a triangular/pyramidal shape, however, alternative geometric shapes may be utilized for the light directing structures 101b. In one embodiment, light directing structures 101b are concentrically arranged to at least partially surround light emitting apparatus 103. Referring to FIG. 2B, light directing structures 101b can form a patterned area that can be cut into the shape of the transparent component (e.g., the hexagonal shape of transparent component 109 in FIG. 1A).

Referring again to FIG. 1A, concentric grooves 101c are concentrically aligned spaces that form circular or semicircular geometric patterns above, below, or within illumination component base 101a. Concentric grooves 101c separate radially adjacent light directing structures of radially aligned groupings of light directing structures 101b. In one embodiment, concentric grooves 101c proceed deeper into base 101a with radial distance from the light emitting apparatus 103. Moreover, in one embodiment, concentric grooves 101c can become wider with radial distance from the light emitting apparatus 103. FIG. 2A highlights the feature of the construction of concentric grooves 101c, wherein depth of the grooves increases with distance from light emitting apparatus 103. It should be appreciated that this pattern provides for the increased illumination gradient as the distance from the light source increases to enable the uniform illumination observed by a viewer.

Radial grooves 101d are spaces that extend radially outward from light emitting apparatus 103, and like concentric grooves 101c, can be formed above, below, or within illumination component base 101a. In one embodiment, radial grooves can become deeper with radial distance from light emitting apparatus 103. Moreover, in one embodiment, radial grooves 101d can become wider with radial distance from light emitting apparatus 103. Radial grooves 101d separate adjacent light directing structures 101b that are located in the same concentrically aligned ring/partial ring of light directing structures. The configuration of radial grooves 101c and concentric grooves 101d define light directing structures having an increased surface area and an increased illumination gradient as the distance for the light source increases.

In one embodiment, light emitting apparatus 103 can be placed into a circular channel near the center region of apparatus 101. As shown in FIG. 2A, light emitting apparatus 103 can include point light sources 103a that emit light into the body of apparatus 101 outward from its center. In other embodiments, light emitting apparatus 103 can be configured to surround, or to partially surround, the perimeter of apparatus 101. In either embodiment, the illumination gradient of the light structures would increase as the distance from the light source increases.

Figure 3:
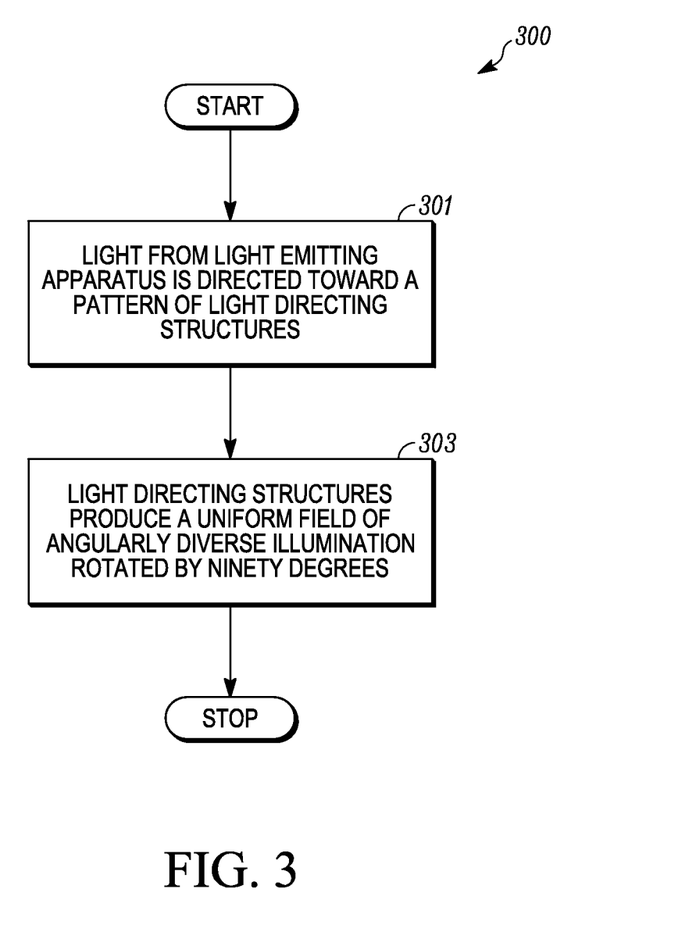
FIG. 3 shows a flowchart of a method for transforming light from a set of point light sources into a uniform field of illumination according to some embodiments.

FIG. 3 shows a flowchart 300 of a method for transforming light from a set of point light sources into a uniform field of illumination according to one embodiment. Although specific steps are disclosed in the flowcharts, such steps are exemplary. That is the present embodiment is well suited to performing various other steps or variations of the steps recited in the flowchart. Referring to FIG. 3, at 301, light received from a light emitting apparatus (e.g., 103 in FIG. 1A) is directed toward a pattern of light directing structures (e.g., 101b in FIG. 1A). In one embodiment, the light that is received from the light emitting apparatus is propagated along a first plane of propagation into an illumination component base (e.g., 101a in FIG. 1A). The light source may be placed within the interior of the pattern of light directing structures or the exterior of the pattern of light directing structures. At 303, angularly diverse light rays of uniform intensity are produced by the pattern of light directing structures and the angularly diverse light rays are propagated in a direction that is orthogonal to the direction of the light received from the light emitting apparatus. Accordingly a uniform field of illumination is produced as the illumination gradient of the pattern of light directing structures increases with the distance from the light source.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein. It should be appreciated that while the embodiments are described with regard to a storage array, the embodiments may be extended to any device having to be configured for installation or reconfigured.

With regard to exemplary embodiments thereof, a light directing apparatus is disclosed. The light directing apparatus includes light directing structures that are configured to receive light from a light emitting apparatus, a first plurality of spaces that separate the light directing structures in a first direction and a second plurality of spaces that separate the light directing structures in a second direction. A dimension, e.g., width or depth, of the first plurality of spaces and a dimension of the second plurality of spaces increases with distance from the light emitting apparatus. In one embodiment, the surface area of each light directing structure increases with distance from the light emitting apparatus. In some embodiments, the light directing structures at least partially surround the light emitting apparatus, however, the light directing structures may at least be partially surrounded by the light emitting apparatus in other embodiments. In one embodiment, a transparent component above the light directing components has a top surface that has a textured finish and side surfaces that have a smooth finish.

In one embodiment, by molding or otherwise forming the apparatus (e.g., 101 in FIG. 1A) for transforming light from a set of point light sources into a uniform field of illumination such that the apparatus encompasses a special pattern of light directing components 101a that is formed on (or in a surface of) a transparent base of plastic or other suitable material (e.g., illumination component base 101a), the light emitted from the set of point light sources (e.g., light emitting apparatus 103; such as LEDs with conical emission patterns) is transformed via reflection and refraction, into uniform strength illumination, with high angular diversity, over a broad area. A transparent component (such as a logo) can be placed in front of the illumination, and thus can be illuminated in a uniform fashion.

The pattern on or within the apparatus that is molded or otherwise formed from plastic or other suitable material is configured to have a reflective profile and a refractive profile with a gradient to increase reflection and refraction at longer distances from the light source. Thus, as the light intensity of light is reduced during propagation with distance from the light source, the illumination gradient, which captures the reflection gradient and refraction gradient, increases to offset the reduction in intensity. In addition, the pattern (which can include additional reflective or textured surfaces) generally rotates the direction of propagation of the light by about ninety degrees with the light propagating perpendicularly from the original plane of emission. The built in diversity of the pattern contributes angular diversity to the rays that are propagated from the pattern (e.g., light from the pattern appears uniform across a wide range of viewing angles), thereby providing a uniform field of illumination.

In one embodiment, the pattern of light directing structures (e.g., 101b in FIG. 1B) consists of two primary constructions, grooves and ridges, that can be cut from or extruded from, respectively, the flat plane of the main illumination component (e.g., illumination component base 101a). In other embodiments, the grooves and the ridges can be formed in other manners. As described in detail above, radial grooves are formed to extend radially from the light sources. The radial grooves become deeper with radial distance from the light sources. In one embodiment, as also described above, concentric grooves are formed to extend concentrically around the light sources (or inside of a perimeter formed by the light sources in another embodiment). The concentric grooves become deeper with radial distance from the light sources. In one embodiment, texture can be applied to various surfaces of the apparatus (e.g., 101 in FIG. 1A) for transforming light from a set of point light sources into a uniform field of illumination that scatters the light further and has the effect of further increasing the uniformity of the generated field of illumination at a smaller scale. It should be appreciated that alternative patterns may be applied to the illumination component. That is, patterns that provide for an increased illumination gradient as the distance from the light source increases may be integrated with the embodiments to provide for a uniform field of illumination.

In one embodiment, apparatus (e.g., 101 in FIG. 1A) for transforming light from a set of point light sources into a uniform field of illumination can be used to illuminate various types of devices that include but are not limited to logos and displays for phones, tablets, televisions, etc. Advantages provided by exemplary embodiments include obviating the need to use layers of material that are applied to glass or plastic to effect the turning of light in a screen toward an observer thereof. It should be appreciated that the reflective effect of exemplary embodiments arises from the geometry of the apparatus (e.g., 101 in FIG. 1A) and not the utilization of separate materials. Exemplary embodiments improve the efficiency of illumination (the amount of light coupled out to observers from the original amount of light received from light sources) dramatically over previous methods.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A light directing apparatus comprising:
   light directing structures configured to receive light from a light emitting apparatus, the light emitting apparatus disposed within an interior channel defined within an illumination component, the light directing structures defined on a first surface of the illumination component;
   a first plurality of grooves between the light directing structures, the first plurality of grooves in a first direction, the first direction radial from the light emitting apparatus;
   a second plurality of grooves between the light directing structures, the second plurality of grooves in a second direction concentric to the light emitting apparatus, wherein a distance between the second plurality of grooves increases with distance from the light emitting apparatus, wherein an illumination gradient of the light directing structures increases with distance from the light emitting apparatus, the illumination gradient comprising a reflective gradient and a refractive gradient, and wherein a thickness of the illumination component is non-uniform in the second direction.

2. The light directing apparatus of claim 1, wherein the light directing structures form a pattern.

3. The light directing apparatus of claim 1, wherein the light directing apparatus is composed of a plastic material.

4. The light directing apparatus of claim 1, wherein the second plurality of grooves are orthogonal to the first plurality of grooves.

5. The light directing apparatus of claim 1, wherein an opposing surface to a surface from which the light directing structures extend is textured.

6. The light directing apparatus of claim 1, wherein a surface area of each light directing structure increases with distance from the light emitting apparatus.

7. The light directing apparatus of claim 1, wherein the light directing structures at least partially surround the light emitting apparatus.

8. An illuminating apparatus, comprising:
   a light emitting apparatus, the light emitting apparatus disposed within an interior channel defined within an illumination component; and
   light directing structures configured to cause angularly diverse rays of light to be propagated in a direction that is orthogonal to a direction in which light emanates from the light emitting apparatus, the light directing structures defined on a first surface of the illumination component, wherein an illumination gradient of the light directing structures increases with distance from the light emitting apparatus, wherein the illumination gradient of the light directing structures increases with distance from the light emitting apparatus, the illumination gradient comprising a reflective gradient and a refractive gradient, and wherein a thickness of the illumination component is non-uniform in a direction concentric to the light emitting apparatus.

9. The illuminating apparatus of claim 8, further comprising:
   a transparent component disposed above the light directing structures, the transparent component comprising:
   a top surface having a textured finish; and
   side surfaces having a smooth finish.

10. The illuminating apparatus of claim 8, wherein the light directing structures are patterned across a surface.

11. The illuminating apparatus of claim 8, further comprising:
    a first plurality of grooves between the light directing structures in a first direction; and a second plurality of grooves between the light directing structures in a second direction.

12. The illuminating apparatus of claim 8, wherein an opposing surface to a surface upon which the light directing structures are disposed is textured.

13. The illuminating apparatus of claim 8, further comprising:
    a first reflector disposed above the light directing structures; and
    a second reflector disposed against a surface opposing a surface upon which the light directing structures are disposed.

14. The illuminating apparatus of claim 11, wherein the first direction is orthogonal to the second direction.

15. The illuminating apparatus of claim 8, wherein the light emitting apparatus is at least partially surrounded by the light directing structures.

16. The illuminating apparatus of claim 8, wherein the light directing structures are defined by radial grooves and concentric grooves and are arranged to at least partially surround the light emitting apparatus.

17. A method of directing light comprising:
    directing light received from a light emitting apparatus toward a pattern of light directing structures, the light emitting apparatus disposed within an interior channel defined within an illumination component having the light directing structures; and
    from the pattern of light directing structures, producing angularly diverse light rays that are propagated from the illumination component, in a direction orthogonal to the direction of the light received from the light emitting apparatus, wherein an illumination gradient of the pattern of light directing structures increases with distance from the light emitting apparatus, the illumination gradient comprising a reflective gradient and a refractive gradient, and wherein a thickness of the illumination component is non-uniform in a direction concentric to the light emitting apparatus.

18. The method of claim 17, wherein the light received from the light emitting apparatus is directed from a center region of the pattern of light directing structures.

19. The method of claim 17, wherein the light received from the light emitting apparatus is received by light directing structures that at least partially surround the light emitting apparatus.

20. The method of claim 17, wherein the illumination gradient is at least partially based on a dimension of grooves between the pattern of light directing structures.

* * * * *